United States Patent Office 2,934,540
Patented Apr. 26, 1960

2,934,540

THIAZOLIDINE INTERMEDIATES FOR PENICILLIN

John C. Sheehan, Lexington, Mass., assignor to Research Corporation, New York, N.Y., a corporation of New York No Drawing. Application May 15, 1957
Serial No. 659,223

2 Claims. (Cl. 260—306.7)

This invention relates to methods and intermediates for the synthesis of penicillins and penicillin-like compounds.

The structure of benzyl penicillin or penicillin G, recognized as one of the most important of the penicillin family of antibiotics, has been established as follows (I):

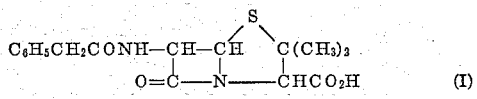
(I)

Many attempts have been made to synthesize this compound, but until the invention described in my copending application Serial No. 551,732, filed December 8, 1955, the desired result has not been attained except in extremely minute yields. In efforts to achieve this result the most frequently used intermediate has been β-methyl α-benzylpenicilloate (IIa), although the corresponding benzylpenicilloic acid (IIb) has also been used:

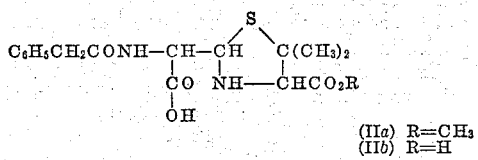

(IIa) R=CH₃
(IIb) R=H

Of critical importance is the closure of the β-lactam ring

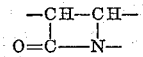

While it would appear that a simple condensation reaction might serve to convert (IIb) into (I) with closure of the β-lactam ring, this has not been successful.

The reason for the failure of these efforts has been the fact that there are two reactions in serious competition with the lactamization. The α-carboxyl function decarboxylates under mild conditions, and perhaps even more important, the formation of an azlactone structure, with isomerization to a penicillenate (III), is the most favored reaction:

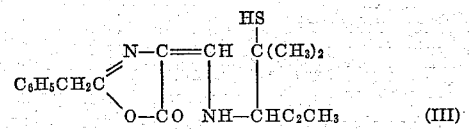
(III)

There have been various attempts to effect the desired synthesis by the use of agents which will prevent or reduce the formation of the azlactone ring

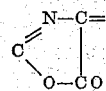

but these have either failed in their purpose or have resulted in other undesirable reactions. For example, the present inventor, with Henery-Logan and Johnson, reported in J.A.C.S. 75, 3292 (1953), the synthesis of a β-lactamthiazolidine (IV) having the penicillin structure except for the substitution of a phthalimido group for the acylamino side chain:

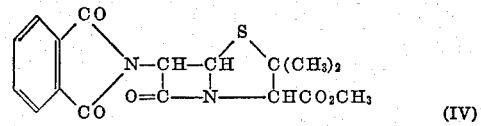
(IV)

However, the side chain could not be removed or substituted without destruction of the essential parts of the molecule, and the stereochemistry may have been different from that of penicillin G. The product was biologically inactive.

Other blocking groups, so named because of their ability to block azlactonization, have sometimes resulted in the sulfone (V), which is biologically inactive, and which has resisted efforts to reduce it to the desired structure.

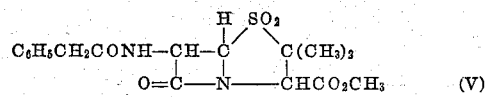
(V)

Although antibiotic penicillin is now manufactured economically by fermentation, synthesis of the penicillins and their analogues is an important goal, because of the possibility of obtaining antibiotics having certain desirable characteristics, as for example, insensitivity to acids. By the general term "penicillin," I mean a structure having the characteristic ring structure (VI):

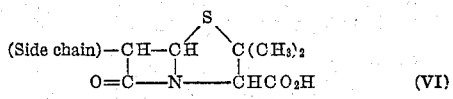
(VI)

with the further characterization that the side chain shall be one which affords biological activity, or which can be removed or converted to an active form without rupture of the β-lactam ring. It will be understood, of course, that variations in the substituents, in accordance with familiar principles of organic chemistry, are to be permitted without departing from the sense of the foregoing definition. For example, although (VI) is shown with a free carboxyl group, it will be understood that the methyl ester may be substituted therefor, since the ester is readily hydrolyzed to the acid by chemical methods or enzymatically by use of an esterase and also possesses antibiotic activity in vivo. According to the suggested nomenclature in the Sheehan et al. paper, (VI) may be termed a "penicillanic acid" and the corresponding ester a "penicillanate."

The invention is based on my discovery that 4-carboxy-5,5-dimethyl-α-acylamino-2-thiazoline acetic acids and their esters of the formula

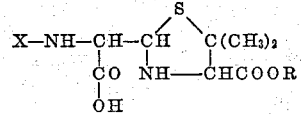

wherein X represents an alkyl, acyl, aralkyl or alkoxy sulfonyl group, such as benzylsulfonyl, benzenesulfonyl, toluenesulfonyl, p-nitrobenzenesulfonyl, and methoxysulfonyl, a carboaryloxy, carboaralkoxy or carboalkoxy groups, such as carbobenzoxy, p-nitrocarbobenzoxy, carbophenoxy and carbomethoxy, a formyl group or a phosphoryl group such as phenylenephosphonyl, and R represents hydrogen or a lower alkyl or aralkyl ester group, such as methyl and benzyl may readily be cyclized by treatment with a condensing agent to the corresponding penicillins which are either biologically active in themselves or can readily be converted to biologically active penicillins.

Suitable condensing agents include thionyl chloride, phosphorus oxychloride and the carbodiimide, keteneimine and acetylenic ether β-lactonizing agents disclosed in my application Serial No. 643,260, filed March 1, 1957.

The starting material is conveniently t-butyl-4-carbomethoxy-5,5-dimethyl-α-phthalimido-2-thiazolidine acetate (VII), particularly the stereoisomeric form designated as "α" and corresponding in configuration to the natural penicillins:

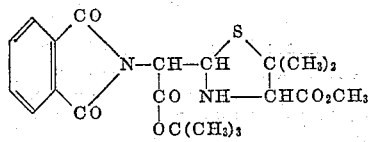

(VII)

The compound (VII) is structurally the compound (IV) of the Sheehan, Henery-Logan and Johnson paper above-mentioned.

*Example 1.*—A solution of 1.3 g. of the α-isomer of this material and 1.88 g. of hydrazine hydrate in 200 ml. of dioxane was stored at room temperature for 20 hours, after which solvent and excess hydrazine were removed by lyophylization. The phthalhydrazide complex was decomposed by shaking in 190 ml. of 0.2 N hydrochloric acid at room temperature for two hours. After cooling in an ice bath for an additional hour, 4.9 g. (100%) of phthalhydrazide was removed by filtration, and the filtrate lyophylized. An amine hydrochloride was crystallized from methanol-ether to provide 8.93 g. (87%) of fine needles, M.P. 167–168° C. dec. A second crop of 0.40 g. (4.1%), M.P. 174.5° C. dec., brought the yield of hydrochloride to 91%. The amine hydrochloride has the following structure (VIII):

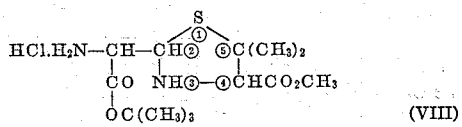

(VIII)

This compound, t-butyl 4-carbomethoxy-5,5-dimethyl-α-amino-2-thiazolidine-acetate hydrochloride (VIII) is an intermediate of great importance since the amine hydrochloride (or other acid) group is capable of ready substitution. It is not essential that the methyl ester be used, as the acid itself may be used, or any ester which will survive subsequent treatment with HCl and which can later be converted to the acid. The methyl group at position 4 is preferred for facility of subsequent treatment although higher alkyl groups (usually with not more than 3 carbon atoms) may be used, and the benzyl group is also satisfactory, especially because it can ultimately be most readily converted to the acid. Similar substituents may be used in place of methyl at position 5. A tertiary alkyl group, such as the tertiary butyl or tertiary amyl group, is preferred at the acetic acid group because of the well-known property of esters of tertiary alcohols to be cleaved to the free acid by treatment with HCl. In general, therefore, (VIII) may take the following form:

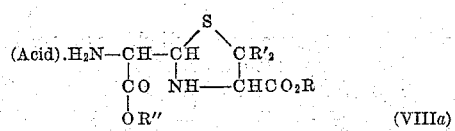

(VIIIa)

wherein R and R' represent H, an alkyl group with not more than 3 carbon atoms or a benzyl group, and R" represents a tertiary alkyl group.

It will be seen that (VIII) or (VIIIa) has the thiazolidine ring structure characteristic of a penicilloate but with an amine hydrochloride side chain.

According to the preferred form of the invention, there is substituted for the amine hydrochloride group a sulphonyl derivative group having the general structure X'SO₂NH where X' is any alkyl, aralkyl or aryl group, but preferably the benzyl group C₆H₅CH₂—. This may be accomplished in the following manner:

*Example 2.*—To a solution of 5.0 g. of (VIII) and 3.03 g. of triethyl amine in 75 ml. of methylene chloride at a temperature of 0° there is added a solution of 2.95 g. (0.0154 mole) of benzylsulfonyl chloride in 25 ml. of methylene chloride. After 12 hours, the solution is washed thoroughly with water, dried with magnesium sulfate, and concentrated under reduced pressure to a colorless resin. From absolute ethanol there is obtained 4.8 g. (71.5%) of colorless needles, M.P. 150–151° C. Two recrystallizations from ethanol give an analytical sample, M.P. 153.5–155° C. having the following structure (IX):

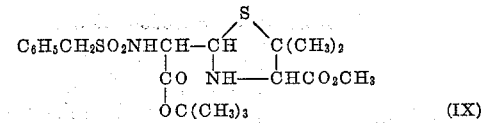

(IX)

Treatment of (IX) in nitromethane solution with anhydrous hydrogen chloride at 0° C. results in (X):

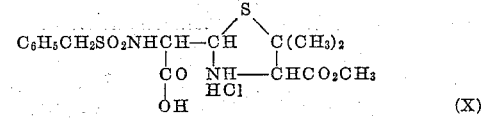

(X)

The structural similarity of this compound (X) to the intermediate (II) may be noted. The principal difference is in the sulfonamide side chain. This difference is of the utmost importance, since while any known treatment of (II) (a or b) favors azlactonization against the closure of the β-lactam structure, compound (X) may be treated to obtain the β-lactam structure without azlactone ring formation. The sulfonamide group constitutes an adequate blocking group against azlactonization and it has the characteristics which have been sought for in the penicillin structure.

*Example 3.*—A suspension of 1.67 g. of (X) in a mixture of 25 ml. of purified thionyl chloride and 75 ml. of methylene chloride is heated under reflux for 105 minutes. The resultant yellow solution is concentrated at 40° C. under reduced pressure; 50 ml. of benzene is added to flush out the thionyl chloride. The residue is taken up in methylene chloride and washed with a 5% sodium bicarbonate solution. After concentration, the residue is dissolved in 10 ml. of benzene. Within one hour at room temperature, 0.335 g. (23%) of a crystalline substance, M.P. 212–214° C. dec., is obtained. An analytical sample, obtained by recrystallization from ethanol, had M.P. 214–215° C. dec. The resulting product is (XI):

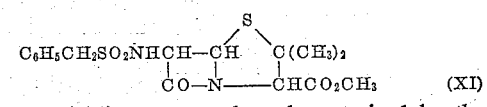

(XI)

having the penicillin structure but characterized by the benzylsulfonamido side chain. Whether or not the side chain is amenable to removal or substitution, product (XI) itself satisfies the criteria for penicillin, since it (or its acid derivative) possesses biologic activity. It is further characterized by insensitivity to acids.

The product (XI) is in the form of an ester, specifically the methyl ester, because of the preferred use of the ester throughout the process. The esters may be converted to the acid by chemical or enzymatic methods, for example, by the action of esterase.

When the benzyl ester is used in the process of the invention the product may be readily converted to the free acid by hydrogenolysis at room temperature and atmospheric pressure in 5% acetic acid in dioxane in the presence of a palladium catalyst, for example, 30% palladium on charcoal.

It has been mentioned that the α-stereoisomeric form of VII is preferably used in the present invention. This compound has three asymmetric carbon atoms as shown by the starred positions below:

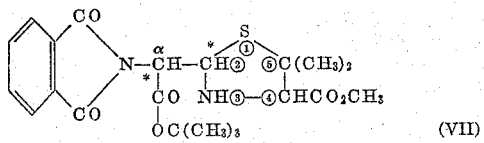

(The use of α to indicate position in the diagram should not be confused with the use of the same term to indicate a particular stereoisomer.)

There are eight possible stereoisomers, corresponding to four racemic pairs. Since DL-penicillamine is used as a starting material in the example given herein, as will presently appear, the products obtained consist of racemic pairs. Of the four possible racemic pairs, two were found to predominate. These were arbitrarily designated as γ and α. The α-isomer has been found to correspond in configuration with the natural penicillins.

In the preparation of (VII) it is possible to obtain the α-isomer in substantially pure form, by conversion of the γ-isomer in a preceding step of the process.

For this purpose, the starting material is t-butyl α-phthalimidomalonaldehydate (XII) which is reacted with DL-phenicillamine hydrochloride (XIII):

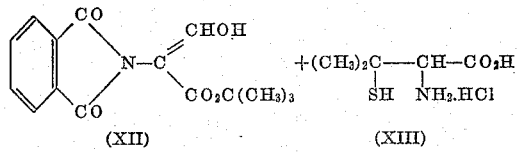

For example, to a solution of 45 g. of (XII) in 300 ml. of warm ethanol was added a solution of 29 g. of (XIII) and 32 g. of sodium acetate trihydrate. After storage at room temperature for 24 hours, the first crop of colorless needles of (XIV) was collected by filtration; weight after recrystallization from aqueous acetone 36.5 g., M.P. 185–186° dec. Addition of 400 ml. of water to the mother liquors (in portions over a period of 3 days) afforded a second crop; weight after recrystallization 15.0 g., M.P. 180° dec.

The resulting material, t-butyl 4-carboxy-5,5-dimethyl-α-phthalimido-2-thiazolidine acetate has the structural Formula XIV:

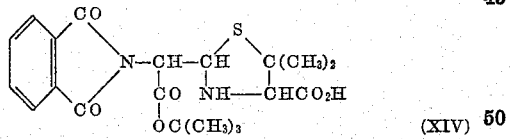

similar to (VII) except for the carboxyl group at position 4.

The first crop of crystalline (XIV) was dissolved in 450 ml. of dioxane (heating required), and the solution treated with an excess of ethereal diazomethane. The ester (VII) was crystallized from 50 ml. of 95% ethanol, giving 27.7 g. of colorless prisms, M.P. 119–122° C. This material is the one designated the γ-isomer of the compound (VII), and is identical in all respects with the ester (IV) of the Sheehan, Henery-Johnson and Logan paper above referred to, and with the ester (IVc) of the Sheehan and Johnson paper, 76 J.A.C.S. 158 (1954).

Similar treatment of (XIV) from the condensation afforded, after crystallization from 60 ml. of ethanol, 8.2 g. (16%), M.P. 175–176°, of an ester shown to be stereoisomeric with the one described above. Recrystallization from ethanol afforded an analytical sample, M.P. 176–176.5°. This is the α-isomer. The combined mother liquors from these esters afforded an additional 10.4 g. of the low-melting γ-isomer of (VII). Of the total yield of (VII) approximately ⅙ was in the α form.

Isomerization of (VIIγ) to (VIIα) may now be effected by the use of a tertiary organic nitrogen base such as the tri-lower alkylamines, the pyridine bases, such as pyridine, collidine and lutidine, and the quinoline bases. For this purpose triethylamine is preferred, because of its good solvent properties and its mildly basic character. The preferred procedure is as follows: A solution of 40 g. of (VII) in 400 ml. of pure triethylamine was refluxed under an atmosphere of prepurified nitrogen for 13 hours. Upon cooling 14 g. of the higher melting α-isomer separated.

An additional 14.0 g. (0.032 mole) of (VIIγ) was added to the triethylamine mother liquors, and the solution of (VIIα) crystallized upon cooling. A second recycling of the mother liquors, without addition of further γ-isomer, afforded 7.8 g. additional (VII).

The combined fractions of product were dried at 70°/25 mm., and recrystallized from 300 ml. of 95% ethanol. The conversion yield to α-isomer was 34.1 g. (63%), M.P. 177–178°.

The resulting product is then the starting material (VII) for synthesis of the key intermediate (VIII) and the penicillin (XI), the α-configuration being found to persist throughout. Stereochemical identity of the α-isomer with natural penicillin has been established experimentally.

I claim:
1. Compounds of the general formula

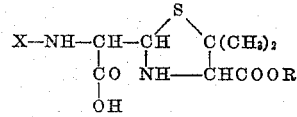

wherein X represents a member of the group consisting of lower alkylsulfonyl, monocyclic arylsulfonyl, monocyclic lower aralkylsulfonyl, and lower alkoxysulfonyl, and R is a member of the group consisting of hydrogen, lower alkyl and monocyclic lower aralkyl.

2. 4 - carbomethoxy - 5,5 - dimethyl - α - benzylsulfonylamino-2-thiazolineacetic acid of the formula

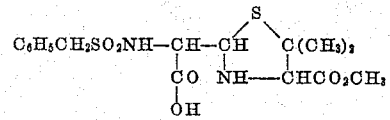

References Cited in the file of this patent

Sheehan: J. Am. Chem. Soc., vol. 75, pp. 3292–3 (1953).

Sus, Liebig's Annalen, vol. 571, pp. 201–225 (1951).

The Chemistry of Penicillin, pages 161–2; 544–550; 553; 852; 991 (Princeton University Press, Princeton, N.J.) (1949).

Sheehan: J. Am. Chem. Soc., vol. 76, pp. 158–160 (1954).